April 28, 1970 J. D. WILLIAMS 3,509,023
NUCLEAR REACTOR PLANT
Filed July 11, 1967 2 Sheets-Sheet 2
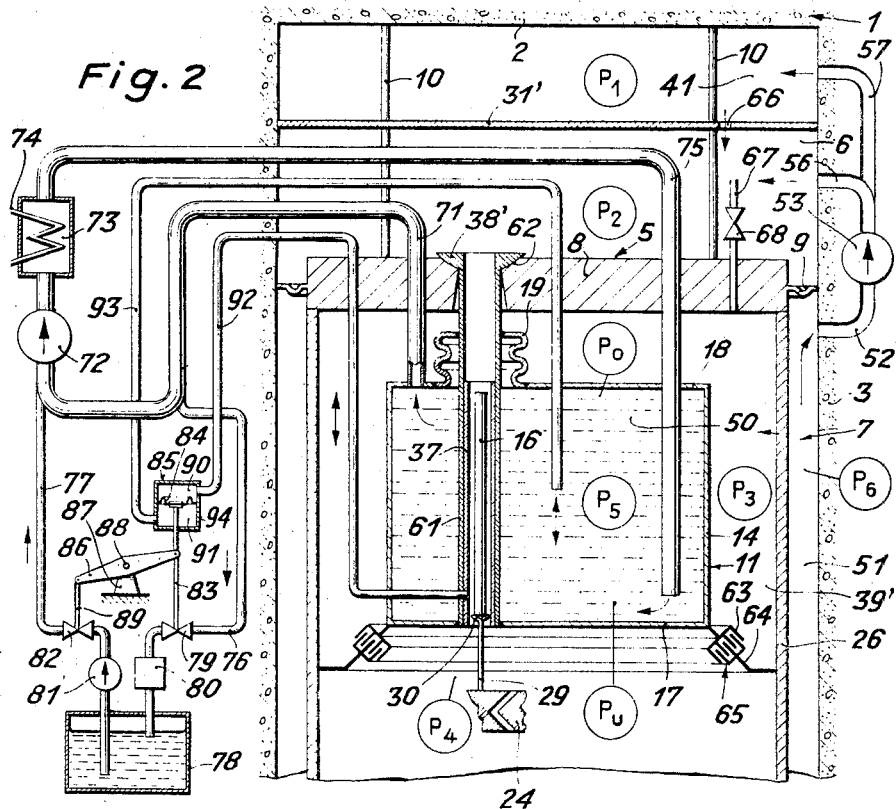
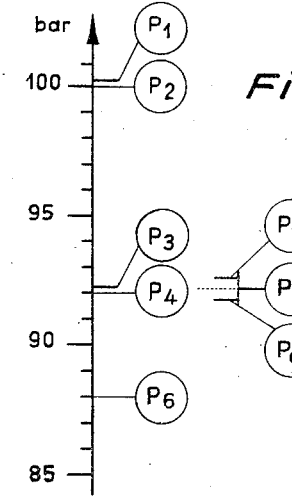
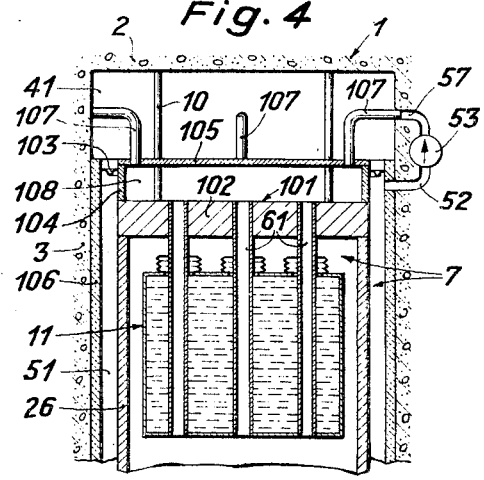
Inventor:
JOHN D. WILLIAMS
BY
Kenyon & Kenyon
ATTORNEYS

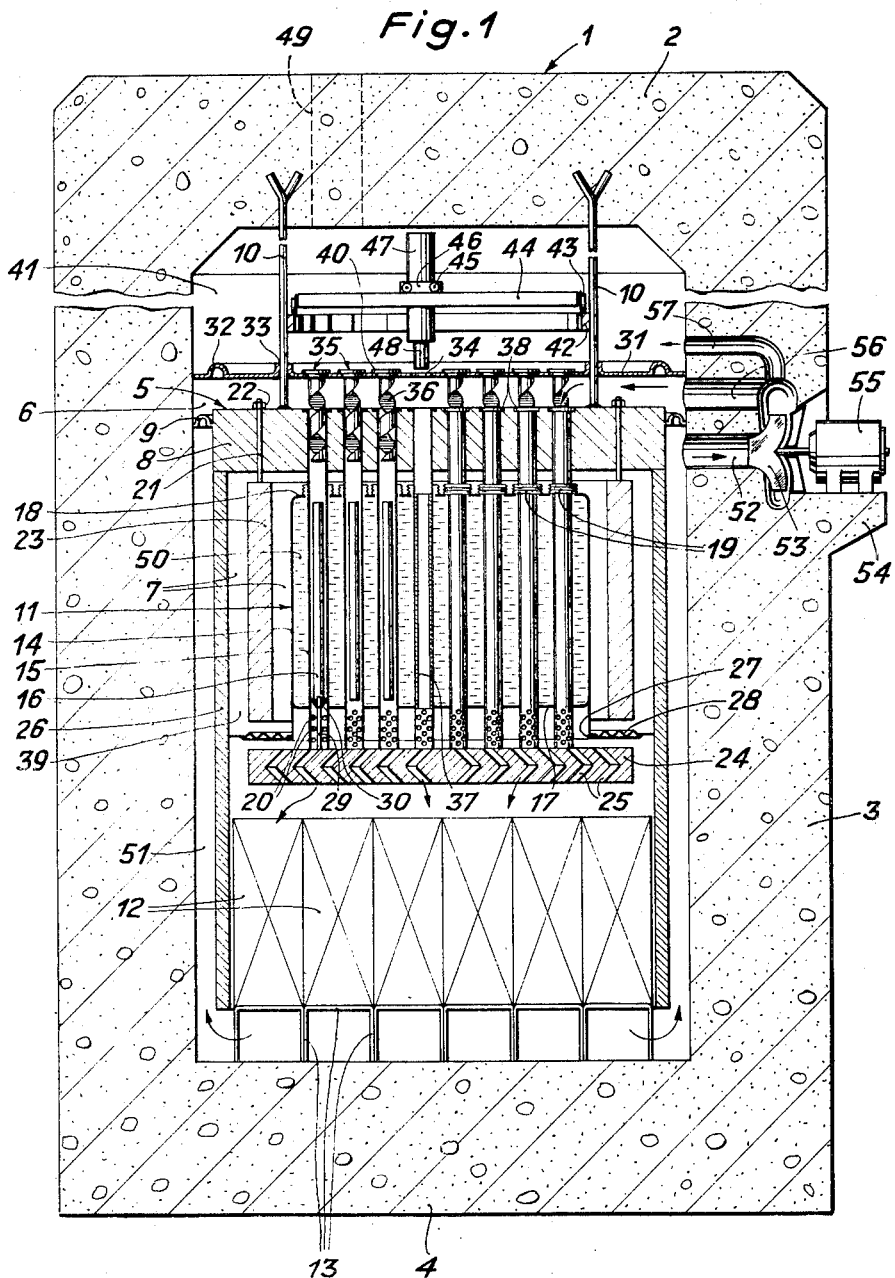

United States Patent Office 3,509,023
Patented Apr. 28, 1970

3,509,023
NUCLEAR REACTOR PLANT
John Delwyn Williams, Winterthur, Switzerland, assignor to Sulzer Brothers, Ltd., Winterthur, Switzerland, a corporation of Switzerland
Filed July 11, 1967, Ser. No. 652,480
Claims priority, application Switzerland, July 14, 1966, 10,261/66
Int. Cl. G21c 19/02, 19/00, 13/02
U.S. Cl. 176—52        14 Claims

ABSTRACT OF THE DISCLOSURE

The nuclear reactor is suspended by the separating columns from the intermediate floor of the pressure vessel and the intermediate floor is suspended by tie rods from the ceiling of the pressure vessel. The support for the nuclear reactor is sealed from the relatively hot coolant gases emerging from the reactor and thus need not be of high heat resistant material. Also, the pressure of the moderator fluid in the reactor is regulated with respect to the coolant passing through the separator columns.

---

This invention relates to a nuclear reactor plant. More particularly, this invention relates to a nuclear reactor plant wherein a nuclear reactor having separator columns containing fuel or control elements is accommodated within a pressure vessel.

Heretofore, in nuclear reactors having reactors with separator columns containing fuel or control elements disposed within pressure vessels, the reactors have frequently been supported on a supporting structure situated within the pressure vessels and supported on a correspondingly constructed base. In the case of those nuclear reactors in which a gaseous cooling medium, such as helium or carbon dioxide, flows vertically downwardly through separator columns, the supporting structures have been situated in the region in which the heated cooling medium emerges from the separator columns. The temperature of the emerging cooling medium may, for example, be 600° C. Further, the supporting structures have also served as a biological screen having apertures through which the heated cooling medium can pass. Thus, the individual supports have required good heat insulating properties and, in many cases, the hollow guides of the supporting framework have required a cooled coolant to pass through their interior.

The supporting structures of the heretofore known plants when disposed in the hot zone of the plants have required a complicated structure which, by reason of the high bending stresses which arise, must also be of relatively considerable structural height. The supporting structures have therefore required a correspondingly large free space within the pressure vessel.

Where the bracing of such a supporting structure is concerned, even the mounting thereof within the hot zone presents considerable problems. The wall of the pressure vessel is thus exposed to a particularly high and relatively complicated stress. For example, the wall must have projecting supporting shoulders which must be safeguarded against contact with the hot gases. In conjunction with the considerable forces arising with such plants, static conditions are created, the control of which necessitates considerable outlay on construction.

Also, should a reactor be supported in a pressure vessel in a suspended manner by means of anchoring rods which engage on the bottom of the reactor, the bottom of the reactor corresponding to the very considerable weight of the reactor would require dimensioning to cope with the considerable stress which would develope through deflection.

Accordingly, it is an object of the invention to control the heat expansion of a nuclear reactor within a pressure vessel.

It is another object of the invention to mount a nuclear reactor within a pressure vessel in a compact manner.

It is another object of the invention to support a nuclear reactor within a pressure vessel at points spaced from the hot zone of the plant.

It is another object of the invention to reduce the cost of construction of a nuclear reactor plant.

It is another object of the invention to reduce the weight of a nuclear reactor plant.

It is another object of the invention to suspend a nuclear reactor within a pressure vessel of a nuclear reactor plant.

Briefly, the nuclear reactor plant of the invention has a nuclear reactor which is suspended within a pressure vessel by means of separating colums which extend from the top of the reactor. Thus, in the region of the hot coolant emerging from the bottom of the reactor, the nuclear reactor plant has no supporting structure which is exposed to considerable bending stresses. The separating columns which are subject to tensile stresses due to the weight of the reactor, can, above the hot zone, be anchored at suspension points which are surrounded by cooled coolant. The parts carrying these suspension points and which are subjected to relatively high stresses, do not therefore need to consist of any particularly heat-resistant, e.g. stainless, material. Thus, a reduction in material costs as well as simple manufacture of the supporting parts can be achieved. For example, the heat treatment of welded parts, necessary for alloyed steels, becomes unnecessary. The wall of the pressure vessel is also made smooth with no projections.

By suspending a reactor according to the invention, the total weight of the reactor is divided into individual relatively small parts which are relatively evenly distributed over the available space over the corresponding suspension surfaces within the pressure vessel.

These and other objects and advantages of the invention will become more apparent from the following detailed description and appended claims taken in conjunction with the accompanying drawings in which:

FIG. 1 illustrates a longitudinal sectional view through a nuclear reactor plant of the invention;

FIG. 2 illustrates a schematic view of the nuclear reactor plant of FIG. 1 with certain details exaggerated in the simplified manner;

FIG. 3 graphically illustrates the pressures within the nuclear reactor plant of FIGS. 1 and 2; and FIG. 4 illustrates a modification of a nuclear reactor plant of the invention.

Referring to FIG. 1, the nuclear reactor plant has a concrete pressure vessel 1 of circular cross-section which is formed with a ceiling 2, a cylindrical lateral wall 3 and a floor 4. In addition, a substantially horizontal intermediate floor 5 is disposed within and across the pressure vessel 1 to separate the interior of the vessel into an upper space 6 above the intermediate floor 5 and a lower space 7 below the intermediate floor 5. The intermediate floor 5 is constructed of a central fixed part 8 and a resilient peripheral part 9 which assumes the form of a movable packing having a portion abutting the lateral wall 3 so as to virtually tightly separate the upper space 6 from the lower space 7.

The fixed part 8 of the intermediate floor 5 is suspended from tie rods 10, the upper ends of which are spread apart and anchored in the ceiling 2 of the pressure vessel 1. Disposed beneath the intermediate floor 5 are a reactor 11 and a plurality of heat transfer elements 12. The heat transfer elements 12 rest on a supporting structure 13 which stands on the floor 4.

The reactor 11 contains a tank 14 which is filled with a liquid moderator 50 and a plurality of separating columns 15 which accommodate respective fuel rods 16. The separating columns 15 are welded to the bottom 17 of the moderator tank 14 and each column 15 is connected with the ceiling 18 of the tank 14 through a bellows 19 welded on one side to the separating column 15 and on the other side to the ceiling 18 (FIG. 2). Each separating column 15 is lined inside the moderator tank 14 and over the height of the tank 14 with a heat insulating tube 37 and is extended through the floor 17 and the ceiling 18. In FIG. 1, only one heat insulating tube 37 is illustrated for clarity. The bottom ends of the separating columns 15 are provided with lateral apertures 20. The top ends of the separating columns 15 penetrate the fixed part 8 of the intermediate floor 5 and are provided with flanges 38. These flanges 38 are anchored in the intermediate floor 5 so that the weight of the moderator tank 14 is transmitted through the separating columns 15 to the intermediate floor 5.

The intermediate floor 5 takes the form of a biological protective ceiling against the upwardly-directed radiation from the reactor 11. Secured by tie rods 21 and nuts 22 to the intermediate floor 5 is a biological wall 23 enclosing the reactor 11 and providing a screen against lateral radiation from the reactor 11. Secured by means not shown to the bottom ends of the separating columns 15 is a horizontal biological screen 24 which is provided with angled bores 25. In the region of each separating column 15, brackets 29 are provided on the screen 24 the upper ends 30 of which are designed as carrying or receiving elements for the fuel rods 16. FIG. 1 shows only one of the holders 29 for clarity.

Secured to the fixed part 8 of the intermediate floor 5 by means not shown is a freely-suspended cylindrical wall 26 which surrounds the reactor 11 and the heat transfer elements 12. The wall 26 is sealingly connected to the intermediate floor 5, extends to the lower end of the heat transfer elements 12 and ends above the floor 4. At the bottom end of the moderator tank 14, the lateral wall of the tank is extended beyond the floor 17 and is provided with a flange 27 which is connected to the cylindrical wall 26 through a movable seal 28. The seal 28 takes the form of a sealing membrane so that an enclosed space 39 is created between the wall 26 and the side wall of the moderator tank 14 and is sealed at the top by the fixed part 8 of the intermediate floor 5.

Disposed above the intermediate floor 5 is a horizontal separating wall 31 which contains a movable seal 32 with a part abutting the side wall 3 of the pressure vessel 1. The separating wall 31 is provided with apertures 33 through which pass the tie rods 10. The wall 31 also contains apertures 34 which are in alignment with the separating columns 15 which terminate in the intermediate floor 8, and which accommodate plugs 35 made from a radiation-inhibiting material. The plugs 35 extend into the separating columns and provide a screen against upwardly-directed radiation by the fuel rods 16.

Each plug 35 consists of a substantially cylindrical part which is shaped as a so-called spiral member 36 and which is adapted to be inserted into the separating columns 15 and a collar 40 at the upper end by which the plug 35 rests on the separating wall 31. The diameter of the spiral member 36 is somewhat less than the inside diameter of the separating column 15. The cylindrical part has a recess which extends along a helical line. The cross-section of the recess is so chosen that the spiral element 36 introduced into the separating column 15 has at any height the same freely available cross-section, which is approximately half as great as the free cross-section of the separating column 15. Since the free cross-sections of the spiral element 36 are, at any height level, rotated in relation to each other about their longitudinal axis, no radiation can emerge through them.

The space 6 located between the separating wall 31 and the intermediate floor 5 serves as a distributing chamber for a gaseous cooling medium which flows through the separating columns 15. The space located between the ceiling 2 and the separating wall 31 serves as a rod-changing chamber 41. Within the chamber 41 secured to the tie rods 10, is a ring 42 which extends outside of the zone of the separating columns 15 which pass through the intermediate floor 5 and forms a track for wheels 43 of a carriage, of which only one member 44 is illustrated.

Arranged to be mobile on the members 44 is a carrying frame 46 provided with rollers 45 and supporting a rod-changing apparatus 47. Among other things, this carrying frame 46 contains a telescopically constructed tube 48 which is insertable into the separating columns 15, and an arrangement (not shown) for grouping fuel rods 16 or parts thereof. Access to the rod-changing chamber 41 is provided through an entrance aperture 49 disposed in the ceiling 2.

Between the side wall 3 of the pressure vessel 1 and the cylindrical wall 26 is an annular space 41 which is sealed at the top by the intermediate floor 5 yet is open at the bottom. From this space 51, a duct 52 disposed at a small distance beneath the intermediate floor 5 extends to the inlet of a circulating blower 53. The blower 53 is located in a recess in the side wall 3 and is driven by a motor 55 mounted on a console 54 on the side wall 3. The delivery side of the circulating blower 53 is connected by a duct 56 with the distributing chamber 6 and by a duct 57 with the rod-changing chamber 41. The space 39 above the seal 28 is connected by a pipe (not shown) embodying a control means, to a space (not shown) located outside the pressure vessel 1.

During operation, a nuclear fission process occurs within the reactor 11. The heat which is generated in the process is partly conveyed to a cooling medium which flows in a circuit through the reactor 11 and the heat transfer elements 12. The coolant circuit is maintained within the pressure vessel 1 by the circulating blower 53.

From the delivery side of the circulating blower 53, part of the coolant is fed through the duct 57 to the rod-changing chamber 41 which part is fed to the distributing chamber 6 through the duct 56. From the distribution chamber 6, the coolant passes through the free cross-sections of the spiral elements 36 into the separating columns 15, passes through these columns 15 and emerges through the lateral 20 in the separating columns. Upon flowing through the separating columns 15, the coolant absorbs part of the heat released during the nuclear fission process, so that, at the bottom end of the separating columns 15, the temperatures of the coolant is approximately 200–300° C. higher than at the upper end.

The heated coolant emerging through the lateral apertures 20 in the separating columns 15 is passed through the bores 25 in the biological screen 24 and passes into the heat transfer elements 12 which are constructed as vaporizers. Since the bores 25 are angled, no harmful radiation can emerge downwardly through them. During passage through the heat transfer elements 12, the heat within the coolant is transferred to a heat-absorbent medium which is guided in pipes (not shown) laid inside the heat transfer elements 12. The heated heat-absorbent medium is carried through pipes (not shown) out of the pressure vessel 1 and fed to a heat consumer, e.g. a steam turbine.

The coolant which has been cooled in the heat transfer element 12 passes into the space formed by the supporting structure 13 and is guided into the annular space 51 through an anular gap formed between the bottom end of the cylindrical wall 26 and the floor 4. The cooled coolant passes through and over the entire height of space 51 and then passes through the duct 52 to the inlet of the circulating blower 53. From the blower 53, the coolant is carried through the duct 56 into the distributing chamber 6 to a further circuit and through the duct 57 into the rod-changing chamber 41.

The duct 56 is so constructed that it has a greater resistance to flow and hence a greater pressure drop than the duct 57. A greater drop obtains in the rod-changing chamber 41 than in the distributing chamber 6, so that, by possibly inadequately sealed apertures 33 and 35 in the separating wall 31, gas can only pass out of the rod-changing chamber 41 into the distributing chamber 6, but not in the other direction.

Referring to FIG. 2, wherein for sake of simplicity only one separating column 61 is shown, the upper end of which is constructed as a flange 38' having a spherical underside 62. The underside 62 of the flange 38' rests in a correspondingly shaped support provided in the intermediate floor 5. The aperture in the intermediate floor 5 which enclosed the separating column 61 is widened out in conical shape at the bottom so that the separating column 61 can perform a pendulum movement as the result of any horizontal displacements of the moderator tank 14. The bottom end of the separating column 61 is welded flush into the floor 17 of the moderator tank 14. The biological screen 24 is secured by retaining means (not shown) to the bottom end of each separating column 61.

The bottom outer edge of the moderator tank 14 is connected to a sealing element 63 which co-operates with a sealing element 64 connected to the cylinder 26 and forms therewith a labyrinthine packing 65 which, in contrast to the packing 28 (FIG. 1) which is constructed as a sealing membrane, is so constructed that an equalization of pressure can be achieved between the space 39' above the labyrinthine packing 65 and the space beneath it. The space 39' is connected to the distributing space 6 by a pipe 67 passing through the intermediate floor 5 and containing within the distributing space 6 an adjustment valve 68.

The lateral biological wall 23 is not shown in FIG. 2 and only part of the biological screen 24 is shown. The rod-changing arrangement 47 disposed inside the rod-changing chamber 41, has been omitted for the sake of simplicity. Similarly, the apertures 33, 34 provided in the separating wall 31 and through which the tie rods 10 and the plugs 35 (FIG. 1) can pass, have not been shown. In the diagrammatic representation, the total of the leakages formed by the apertures 33, 34 are represented by one aperture 66.

Connected to the ceiling 18 of the moderator tank 14 is a pipe 71 which is guided through the intermediate floor 5 and the side wall 3 to the intake side of a pump 72 disposed outside the pressure vessel 1. The delivery side of the pump is connected to a cooler 73 which contains pipes 74 through which a heat-absorbent medium passes. From the cooler 73, a pipe 75 extends through the side wall 3 and the intermediate floor 5 of the pressure vessel 1 and through the ceiling 18 of the moderator tank 14 to the vicinity of its floor 17.

Connected one after another to the pipe 71 are two pipes 76, 77 extending in the direction of the intake to the pump 72. The first pipe 76 runs from the pipe 71 into a compensating tank 78 and contains a valve 79 and, following this, a moderator preparation plant 80. The other pipe 77 which is closer to the pump 72 passes out of the compensating vessel 78 and contains a pump 81 delivering into the pipe 72 and also a valve 82 which is provided on the downstream side thereof.

The valve 79 is provided with an adjusting mechanism (not shown), which is connected through a control rod 83 with a movable diaphragm 84 of a pressure-comparative apparatus 85 which has a casing 94 divided by the diaphragm 84 and within which the control rod 83 is displaceably guided.

Articulated on the control rod 83 is one arm of a two-armed lever 86 which is pivotally mounted on a pivot 88 mounted on a fixed side-plate 87. The other arm of the lever 86 is articulated on a control rod 89 which is connected to a mechanism (not shown) for adjusting the valve 82.

The diaphragm 84 forms two separate partial chambers 90, 91. The partial chamber 92 is connected through a pipe 92 with the interior of the separating column 61. The pipe 92 passes through the side wall 3 and the intermediate floor 5 as well as through the side wall of the moderator tank 14 and the wall of the separator column 61.

The partial space 91 is connected with the interior of the moderator tank 14 by a pipe 93 which passes through the side wall 3 and the intermediate floor 5 as well as through the ceiling 18 of the moderator tank 14, into which it passes, to terminate at approximately half the height of the moderator tank 14.

Referring to FIGS. 2 and 3, the various pressures which are obtained within the nuclear reactor plant are, for example, substantially in a range from 85 to 101 bars. As described, the circulating blower 53 introduces the coolant into the rod-changing chamber 41 and into the distributing chamber 6, a pressure $P_1$ being generated in the rod-changing chamber 41, which is approximately 0.2 bar higher than the pressure $P_2=100$ bars in the distributing chamber 6. There is a continuous transference of a small quantity of coolant from the rod-changing chamber 41 into the distributing chamber 6 through the leak points in the separating wall 31', represented by the aperture 66.

The pressures $P_2$ of the relatively cold coolant contained in the distributing chamber 6 is diminished as it flows around the fuel rods 16, so that the coolant, heated by 200–300° C., emerging at the bottom of the separating column 61 has a pressure $P_4$ of 92 bars.

During flow of the coolant through the heat transfer elements 12, the pressure in the coolant is further diminished, so that, after emerging from the heat transfer elements 12 in the annular space 51, the coolant has its lowest pressure $P_6$ of 88 bars. It is at this pressure that the coolant is drawn in by the circulating blower 53.

Cooled coolant passes out of the distributing chamber 6 through the valve 68 and the pipe 67, into the space 39' above the labyrinthine seal 65. The valve 68 is so adjusted that a pressure $P_3$ obtains in the space 39', which is a little (approximately 0.2 bar) higher than the pressure $P_4$ in the space under the seal 65. Since the labyrinthine packing 65 permits pressure equalization between the pressures $P_3$ and $P_4$, a correspondingly small quantity of coolant is constantly fed through the valve 68 to the space 39', so that the slight over-pressure of approximately 0.2 bar is retained in the space 39'.

In the case of the plant shown in FIG. 1, with the impermeable packing 28, the pressure $P_3$ in the space 39 is influenced by a regulating means (not shown) disposed outside of the pressure vessel 1. A continuous feed of coolant is not necessary, but the pressure $P_3$ is adjusted according to the pressure $P_4$ by known regulating arrangements (not shown).

Liquid moderator 50 is fed into the cooler 73 via the pump 72, through the pipe 71. After the moderator has passed through and given off its heat to the pipes 74, the now cold moderator 50 is fed back through the pipe 75 into the moderator tank 14. By means of this cooling circuit, the temperature of the moderator 50 is kept substantially constant.

The liquid pressure in the moderator tank 14 is so chosen that the pressure $P_5$ obtaining approximately halfway up the moderator tank 14 corresponds to an internal pressure of the separating column 61, close to the bottom end thereof, and hence approximately to the pressure $P_3$ in the chamber 39'. The pressures $P_o$ and $P_u$ vary by the static heights of the pressure $P_5$.

During operation, the liquid pressure $P_5$ is continuously adapted to the internal pressure of the separating column 61 which is connected to the pressure comparative device 85. When the internal pressure at the height of the connection between the separating column 61 and the pipe 92 of the same magnitude as the pressure $P_5$, the diaphragm in the pressure comparative device 85 is in a central position. The valves 79, 82 in the pipes 76, 77 are closed and the pump 81 does not deliver.

If the pressure inside the separating column 61 drops below the pressure $P_5$, the diaphragm 84 is lifted. The jointly lifted control rod 83 and adjusting arrangements (not illustrated) cause the valve 79 to open, so that moderator fluid 50 passes through the pipe 76 via the moderator preparation plant 80 and into the compensating vessel 78.

The control rod 89 of the valve 82 is lowered by the lever 86 in accordance with the upward movement of the control rod 83. While the closed valve 82 remains unaffected. As soon as sufficient moderator 50 has been drained off for the pressure inside the separating column to equal the pressure $P_5$, the diaphragm 84 is returned to its normal central position. This causes the control rod 83 to be correspondingly lowered and the valve 79 to be closed.

If, on the other hand, the pressure inside the separating column 61 at its connection to the pipe 92 becomes greater than the pressure $P_5$, then the diaphragm 84 in the comparative device 85 is lowered. The control rod 83 which is connected to the diaphragm is moved downwardly, the closed valve 79 in the pipe 76 remaining unaffected. The control rod 89 is lifted by the lever 86 and so causes the valve 82 to open, through adjusting means, not shown.

At the same time, the dive of the pump 81 is influenced by a control signal, so that the pump 81 passes moderator 50 out of the compensating vessel 78 through the opened valve 82 and the pipe 77 into the pipe 71. This continues until the pressure inside the separating column 61 is of equal magnitude with the pressure $P_5$ and the diaphragm 84 has returned to its central position. By reason of the upwards movement of the control rod 83 which results, the control rod 89 is moved downwardly via the lever 86, until the valve 82 is closed and the drive for the pump 81 shut off.

Referring to FIG. 4, the nuclear reactor plant is formed with an intermediate floor 101 having a central fixed part 102 and a resilient peripheral part 103, the central part 102 being connected to a separating wall 105 by a side wall 104 enclosing a distributing space 108. The peripheral part 103 of the intermediate floor 101 which is located between the separating wall 105 and the fixed part 102 of the intermediate floor 101 is secured to the side wall 104 and bears on a neat-insulating lining coating 106 of the wall 3 of the pressure vessel. In this way, only one seal is required, co-operating with the wall 3. The delivery side of the circulating blower 53 is connected by the duct 57 to the rod-changing chamber 41 and a pipe 107 which passes through the separating wall 105 into the distributing chamber 108.

In a modified embodiment of the invention, not shown, a circulating blower can be disposed in the rod-changing chamber 41 with an inlet being connected with the annular space 51 by a pipe penetrating the separating wall 105 and the side wall 104. The circulating blower 53 can then deliver partly directly into the rod-changing chamber 41 and partly into the distributing chamber 108 through a pipe passing through the separating wall. Hence, a weakening of the side wall 3 of the pressure vessel 1 by ducts being disposed therein can be avoided. Also, a plurality of circulating blowers may be disposed in the rod-changing chamber 41 of a size small enough to be inserted or removed, for example, through rod supply apertures, not shown.

The invention thus provides a nuclear reactor plant wherein the intermediate floor divides off a space of relatively low temperature within the pressure vessel such that the supporting parts located in this space are reliably safeguarded against contact with hot gases. Also, the anchoring of the separating columns in the intermediate wall permits a space-saving utilization of the interior of the pressure vessel by the connection of the supporting parts with the radiation an heat-insulating parts. If the intermediate floor is constructed as a biological protective ceiling against the upwardly-directed radiation from the reactor, the wall thickness necessary therefor can easily be accommodated within the structural height of the intermediate floor as required by the static stresses.

The pipes passing through the intermediate floor can be satisfactorily sealed in response thereof and anchored for example at locations on the ceiling of the housing. Thus, the ceiling can be subjected to particularly even stresses.

The space above the intermediate floor, which is connected to the apertures of the separating columns, easily provides a distributing space for the coolant which is to be accommodated in the separating columns. The separating columns do not have to be connected to a distributing system consisting, for example, of individual columns, but are guided into the distributing chamber through the intermediate floor. The separating columns can end on the underside of the intermediate floor and be connected to inlet apertures located in the intermediate floor. By connecting the distributing chamber with the separating columns, the high pressure of the coolant entering into the reactor takes effect only above the intermediate floor and while abating towards the bottom end of the separating columns within the columns.

By suspending the intermediate floor from tie rods set in the pressure vessel, the separating columns can end within the intermediate floor. The free space which is thus formed can serve to accommodate a rod-changing arrangement. In addition, the pressure vessel is subjected to less stress by the suspension of the intermediate floor, e.g. from the ceiling thereof.

A pressure vessel consisting for example of steel-reinforced concrete usually contains in its walls, extending in an axial direction, bracing cables which co-operate with the reinforcing members in the ceiling and in the floor of the pressure vessel and which are designed to cope with the pressure inside the pressure vessel. By reason of the weight of the reactor being transferred to the intermediate floor and since, in the space beneath the intermediate floor, a smaller pressure obtains than in the upper space, forces are exerted through the intermediate floor, via the tie rods to the ceiling part of the pressure vessel, which counteract the forces exerted on the ceiling by the interior pressure.

Therefore, not the entire pressure vessel but only the side wall thereof which encloses the upper part of the space needs to be dimensioned according to the full relatively high pressure of coolant entering into the reactor. The generally fairly large space beneath the intermediate floor can be made of lighter construction, corresponding to the lower pressure present therein. Thus, even smaller forces can be transmitted to the ceiling through the bracing cables and it is possible to economize on bracing cables as compared with the known nuclear reactor plants.

Finally, the ceiling suffers less bending stress through the tie rods than if the tie rods only had to absorb the pressure present in the upper partial space and which acts on the ceiling over the entire span formed between the walls of the pressure vessel.

By constructing the intermediate floor with a suspended rigid and a peripheral resilient part, the intermediate floor can adjust itself to the forces of expansion and perform displacement movements in a horizontal direction.

By the arrangement of the cylindrical wall being freely suspended from the intermediate floor, the annular space located between it and the wall of the pressure vessel can be permeated from the bottom upwards so that the wall of the pressure vessel is at an even temperature over the entire height of the lower space. The pressure vessel is efficiently screened against the effect of the hot coolant by the cylindrical wall and the cooled coolant. A further advantage of the cylindrical wall being suspended from the intermediate floor resides in the fact that it can expand freely under heat.

The flow of coolant is easily guided through the heat transfer element disposed beneath the reactor. The heat transfer element can be braced on the floor of the pressure vessel. The pressure vessel can have a relatively small diameter. The flow of coolant can be so chosen that the inner wall of the pressure vessel is for the most part only exposed to the cooled coolant. By reason of the downwardly-flowing hot coolant, the fuel or regulating rods located in the separating columns are, by the force of flow coolant which may be a multiple of the weight of the rod, pressed and hold firmly against their support.

By reason of the fact that the pressure vessel is sealingly sub-divided by the intermediate floor, the gas at high pressure contained in the space above the intermediate wall can be reliably separated from the gas at lower pressure which is located in the lower space. The ducts connected with the recirculating apparatus can be disposed at a particularly small distance from one another, dependent upon the construction of recirculating apparatus, on both sides of the intermediate floor, so that low flow losses result.

By reason of the separating wall being disposed between the ceiling of the pressure vessel and the intermediate floor, a space can be formed between the separating wall and the ceiling, which has a slight over-pressure as compared with the space formed between the separating wall and the intermediate floor. By reason of this, the collars on the radiation-inhibiting plugs which engage into the separating columns can be reliably pressed against the separating wall.

The cooling agent introduced into the space above the separating wall is at a temperature of approximately 250° C. As considerable heat is dissipated outwardly through the wall and through the ceiling of the pressure vessel, a relatively low temperature can be achieved in this space, for example, 50–100° C. This is of advantage particularly if the space is used to accommodate a rod-changing machine. As is generally desirable, this means that access to the rod-changing chamber may be gained a short time after the reactor has been shut down.

By the suspension of the moderator tank on separating columns welded with the bottom thereof, the floor may have a small thickness, since the weight of the reactor is divided into a number of small individual weights, and therefore is exposed to less stress.

By reason of the packing which connects the bottom zone of the moderator tank with the freely suspended cylindrical wall, the space around the upper part of the moderator tank may be at a pressure which is somewhat higher than the pressure of the coolant emerging from the separator columns, and approximately equal to the liquid pressure acting on the moderator tank. Since the space above the seal contains cooled coolant at a relatively high pressure, no hot coolant can enter the upper space from the space below the seal. In this way, over-heating of the moderator from outside the tank is avoided. A simplification in the flow of coolant is achieved; furthermore, the walls of the tank may consist of a material having no special heat-resistant properties. The stresses on the wall of the moderator tank can be kept particularly low, so that the tank has an advantageously small wall thickness and hence a low rate.

Stressing of the separating column by a considerable external pressure is avoided by the regulating arrangement which likens the fluid pressure in the moderator tank to the pressure inside the separating column. The columns are essentially stressed only by the internal pressure which diminishes from the top end towards the bottom end and by the weight of the reactor which is suspended thereon, so that they cannot be compressed or indented. Thus, a particularly small wall thickness is achieved in the separating columns, which is advantageous for the flow of neutrons.

The biological screen suspended at the bottom ends of separating columns can have a low weight, since it requires only a few components which carry its own weight. Also, this screen can easily perform, without resistance, the horizontal displacement caused by heat expansion. Since this biological screen is not, as in the case of the known plants, constructed as a supporting structure for the reactor, its dimensions need only be chosen in accordance with its weight and its radiation-inhibiting action. Therefore, the height of the screen can be correspondingly low. The screen can also consist of individually suspended loose components which are for example vertically displaceable in respect of one another.

By reason of the bracing arrangements for the fuel or control elements being disposed on the biological screen, the falling energy of a possibly falling element need not be absorbed only by the surrounding separating column, but is distributed over a plurality of columns, through the screen. In the case of a screen made from loose parts, the falling energy of an element which drops is absorbed by the substantially greater mass of the part suspended from the separating column, without the latter being excessively stressed.

What is claimed is:
1. A nuclear reactor plant comprising
   a pressure vessel having a ceiling;
   a substantially horizontally disposed intermediate floor within said pressure vessel below said ceiling separating the interior of said pressure vessel into an upper space and a lower space;
   a nuclear reactor disposed within said lower space of said pressure vessel, said nuclear reactor having a plurality of hollow columns passing upwardly therefrom for receiving fuel elements therein, each said column being anchored to said intermediate floor to suspend said nuclear reactor from said intermediate floor and being open to said upper space to receive gaseous coolant from within said upper space; and
   means secured to said intermediate floor and said ceiling suspending said intermediate floor from said ceiling.

2. A nuclear reactor plant as set forth in claim 1 wherein said means are tie rods.

3. A nuclear reactor as set forth in claim 1 wherein said columns penetrate through said intermediate floor.

4. A nuclear reactor as set forth in claim 1 wherein each said column has at least one aperture in communication with the space between said intermediate floor and said ceiling for inlet of a gaseous coolant therefrom.

5. A nuclear reactor plant as set forth in claim 1 wherein said intermediate floor includes a fixed central part and a resilient peripheral part, and said means is a plurality of tie rods suspending said central part from said ceiling.

6. A nuclear reactor plant as set forth in claim 1 further comprising a cylindrical wall freely suspended from said intermediate floor and surrounding said nuclear reactor, said cylindrical wall being spaced from a surrounding wall of said pressure vessel to define an open-bottomed annular space therebetween.

7. A nuclear reactor plant as set forth in claim 1 wherein said intermediate floor sealingly separates the space thereabove from the space therebelow and further comprising a duct means between the space above said intermediate floor and the space below said intermediate floor for conducting a coolant therebetween, and circulating means disposed in said duct means for circulating the coolant through said duct means from the space below to the space above said intermediate floor.

8. A nuclear reactor plant as set forth in claim 7 further comprising a separating wall disposed in spaced relation between said ceiling and said intermediate floor to sealingly separate the space below from the space above said separating wall, and wherein said duct means includes a pair of ducts, each of said ducts being in communication with one of the spaces below and above said separating wall and with said circulating means.

9. A nuclear reactor plant as set forth in claim 1 further comprising at least one heat transfer element disposed in said pressure vessel beneath said nuclear reactor.

10. A nuclear reactor plant as set forth in claim 1 wherein said nuclear reactor includes a moderator tank having a floor and a ceiling wherein said columns and a moderating fluid around said columns are disposed, each said column being rigidly connected to said floor of said moderator tank and passing through said ceiling of said moderator tank to conduct a gaseous coolant therethrough.

11. A nuclear reactor plant as set forth in claim 10 further comprising a cylindrical wall freely suspended from said intermediate floor in spaced relation to said moderator tank and a surrounding wall of said pressure vessel and a seal means sealingly secured between the lower portion of said moderator tank and said cylindrical wall.

12. A nuclear reactor plant as set forth in claim 10 further comprising regulating means communicating with the interior of said moderator tank and to the interior of at least one column for regulating the pressure of the moderating fluid within said moderator tank with respect to the pressure of the gaseous coolant within said one column.

13. A nuclear reactor plant as set forth in claim 1 which further comprises a biological screen in the form of a horizontally disposed disc suspended from the lower ends of said columns, said screen being permeable to a flow of gaseous coolant.

14. A nuclear reactor plant as set forth in claim 13 wherein a plurality of bracing arrangements are secured to said screen and project into a respective column, each said bracing arrangement supporting a respective one of said fuel elements thereon.

References Cited

UNITED STATES PATENTS

| | | | |
|---|---|---|---|
| 3,026,256 | 3/1962 | Liljebald et al. | 176—52 |
| 3,163,585 | 12/1964 | Metcalfe et al. | 176—87 |
| 3,169,098 | 2/1965 | Leavitt | 178—87 |
| 3,171,790 | 2/1965 | Challender et al. | 176—58 |
| 3,238,106 | 3/1966 | Long et al. | 176—58 |
| 3,239,424 | 3/1966 | Lawson | 176—87 |
| 3,296,082 | 1/1967 | Lemesle et al. | 176—59 |
| 3,296,085 | 1/1967 | Peck et al. | 176—87 |
| 3,342,689 | 9/1967 | Gaudez et al. | 176—52 |

BENJAMIN R. PADGETT, Primary Examiner

H. E. BEHREND, Assistant Examiner

U.S. Cl. X.R.

176—59, 87

PO-1050
(5/69)

UNITED STATES PATENT OFFICE
CERTIFICATE OF CORRECTION

Patent No. 3,509,023      Dated April 28, 1970

Inventor(s) John Delwyn Williams

It is certified that error appears in the above-identified patent and that said Letters Patent are hereby corrected as shown below:

Column 4, line 48, insert "apertures" after --lateral--

Column 8, line 5, "an" should be --and--

Column 8, line 40, "concerete" should be --concrete--

SIGNED AND
SEALED
AUG 25 1970

(SEAL)
Attest:

Edward M. Fletcher, Jr.
Attesting Officer

WILLIAM E. SCHUYLER, JR.
Commissioner of Patents